(12) United States Patent
Eversole et al.

(10) Patent No.: US 10,593,235 B2
(45) Date of Patent: Mar. 17, 2020

(54) ADHESIVE APPLICATION WITH INTERMITTENT DEAD ZONES

(71) Applicant: Mar-Co Packaging, Inc., Benton Harbor, MI (US)

(72) Inventors: Thomas P. Eversole, Saint Joesph, MI (US); Marc Deising, Spring Grove, MI (US); Charlie D. Eversole, South Haven, MI (US); Jim Herring, Delaware, OH (US)

(*) Notice: Subject to any disclaimer, the term of this patent is extended or adjusted under 35 U.S.C. 154(b) by 123 days.

(21) Appl. No.: 15/425,623

(22) Filed: Feb. 6, 2017

(65) Prior Publication Data

US 2017/0148361 A1 May 25, 2017

Related U.S. Application Data

(63) Continuation of application No. 14/601,319, filed on Jan. 21, 2015.

(51) Int. Cl.
| | |
|---|---|
| *G09F 3/10* | (2006.01) |
| *B32B 38/00* | (2006.01) |
| *C09J 7/38* | (2018.01) |
| *B32B 37/12* | (2006.01) |
| *G09F 3/02* | (2006.01) |

(52) U.S. Cl.
CPC ............... *G09F 3/10* (2013.01); *B32B 37/12* (2013.01); *B32B 38/0004* (2013.01); *C09J 7/38* (2018.01); *B32B 2305/72* (2013.01); *B32B 2519/00* (2013.01); *C09J 2201/28* (2013.01); *C09J 2203/334* (2013.01); *G09F 2003/0241* (2013.01); *G09F 2003/0245* (2013.01); *G09F 2003/0248* (2013.01)

(58) Field of Classification Search
CPC ... G09F 3/10; G09F 2003/0241; B32B 37/12; B32B 38/0004
See application file for complete search history.

(56) References Cited

U.S. PATENT DOCUMENTS

| | | | |
|---|---|---|---|
| 2,386,731 A | 10/1945 | Wenzelberger | |
| 2,515,423 A | 7/1950 | Ptasnik | |
| 3,677,859 A | 7/1972 | Clark | |
| 4,910,499 A * | 3/1990 | Benge | G06K 19/0672 |
| | | | 156/324 |
| 4,977,006 A * | 12/1990 | Smith | G09F 3/02 |
| | | | 156/234 |
| 5,639,332 A | 6/1997 | Instance | |
| 5,702,127 A * | 12/1997 | Korondi, Jr. | G09F 3/0288 |
| | | | 281/2 |
| 6,579,585 B1 | 6/2003 | Garvic et al. | |

(Continued)

*Primary Examiner* — Mark A Osele
*Assistant Examiner* — Christopher C Caillouet
(74) *Attorney, Agent, or Firm* — Botkin & Hall, LLP

(57) ABSTRACT

A process is provided to create a strip of selectively pressure-sensitive adhesive material. A first roller unwinds a backing and a roller dispenses a series of separated areas of inhibited adhesive material. A second roller applies a continuous layer of adhesive material over the inhibited adhesive material and backing. A facing is applied over the continuous layer of adhesive material. The machine then winds the finished material. A removable backing is coated with non-sticky material and then covered by a continuous sticky layer of material. A face stock material is then applied over the continuous sticky layer.

15 Claims, 4 Drawing Sheets

(56) References Cited

U.S. PATENT DOCUMENTS 6,926,942 B2    8/2005   Garvic et al.
2005/0100689 A1*   5/2005   He .......................... B32B 27/00
                                                                     428/32.79

* cited by examiner

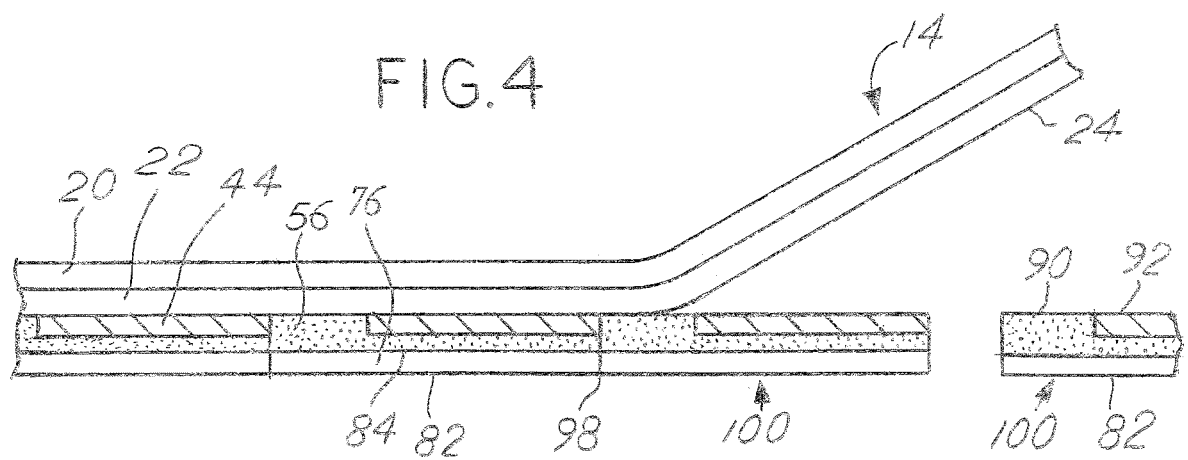
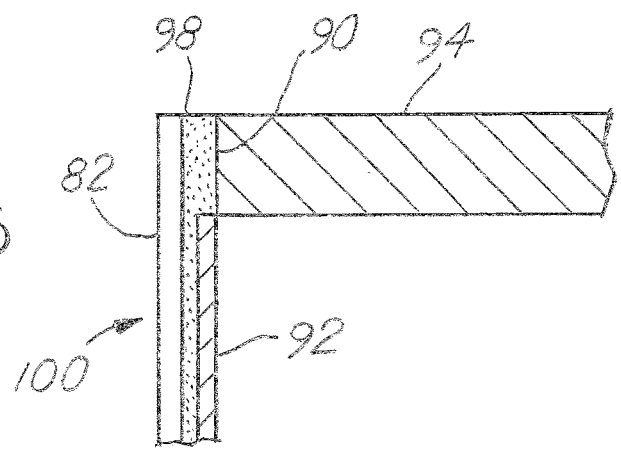

ADHESIVE APPLICATION WITH INTERMITTENT DEAD ZONES

CROSS REFERENCE TO RELATED APPLICATIONS

This application is a continuation of U.S. Utility application Ser. No. 14/601,309 filed Jan. 21, 2015, the disclosures of which is hereby incorporated by reference.

BACKGROUND OF THE INVENTION

Adhesive labels with the use of deadening agents are currently made with a cumbersome and multi-part process. It is desirable to have only certain portions of labels have active adhesive and this is done by applying a deadening agent to a label that is completely coated with adhesive. What is typically done is that labels will be made in sheets and the completely coated adhesive side will have a release paper applied to it. Then, the label or face stock will be rolled with the adhesive paper. In a separate operation, the face stock will be separated from the release paper, then a deadening agent is applied directly to the adhesive in selected areas. Once the deadening agent is applied, the release paper is then bonded back to the adhesive side of the face stock. Currently, label stock that has selective adhesive uses selective application of the adhesive on face stock and leaves the other areas without any adhesive. Selective adhesive that is currently available applies the adhesive directly to the face stock and a releasable backing is applied over it. Improved label stock and process is needed.

SUMMARY OF THE INVENTION

The present disclosure describes a selective pressure-sensitive label and the process to make the same. A releasable backing is unrolled and a kill material is selectively dispensed onto one side. After the kill material is dispensed, an adhesive is dispensed in a continuous fashion over the kill material areas and the gaps between them. The strip is then cured in an oven and a face stock is then applied over the continuous adhesive surface. The strip is then rolled up, printed, and separated as needed.

BRIEF DESCRIPTION OF THE DRAWINGS

A preferred embodiment of this invention has been chosen wherein:

FIG. 4 is a view of the release paper removal; and

FIG. 5 is a view of the product as applied.

DESCRIPTION OF THE PREFERRED EMBODIMENT

Figure 1:
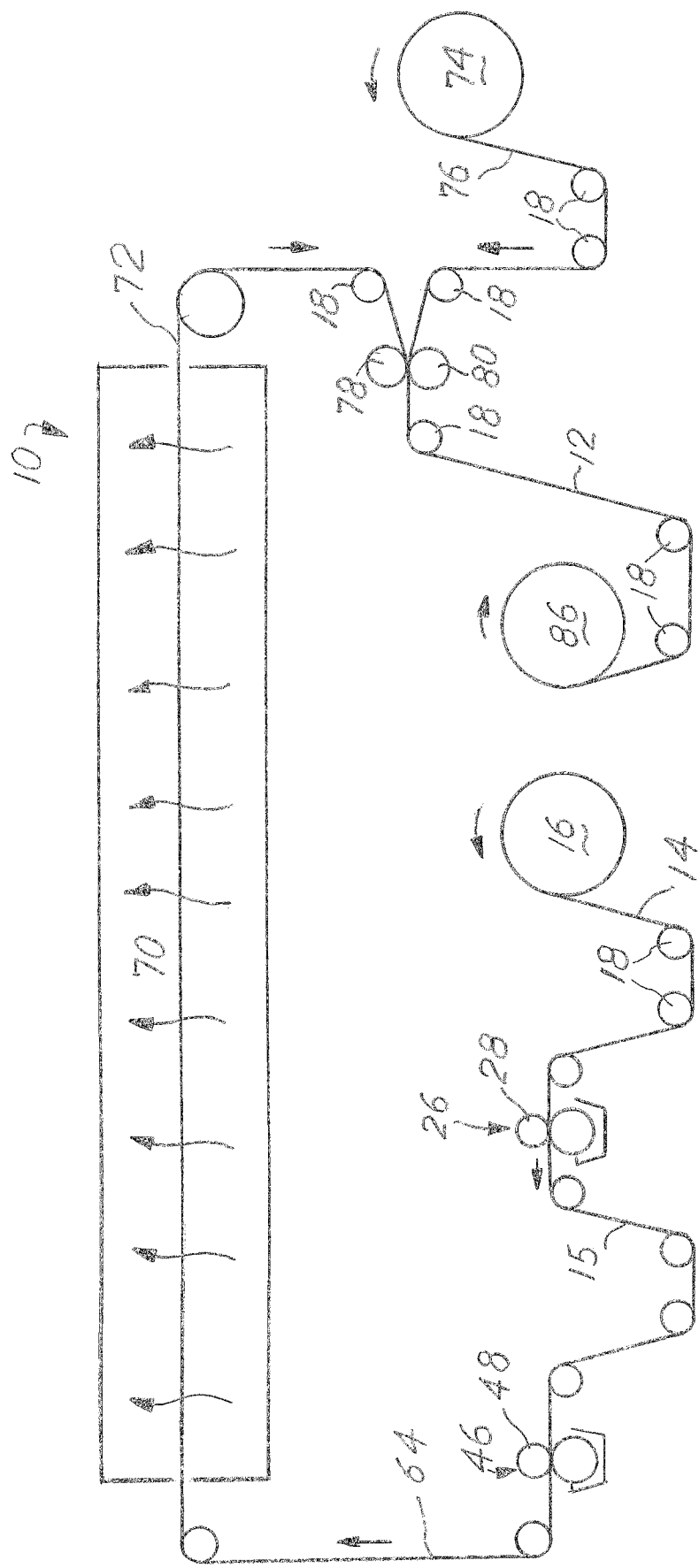
FIG. 1 is a process flow diagram for making the adhesive strip.
Figure 2:
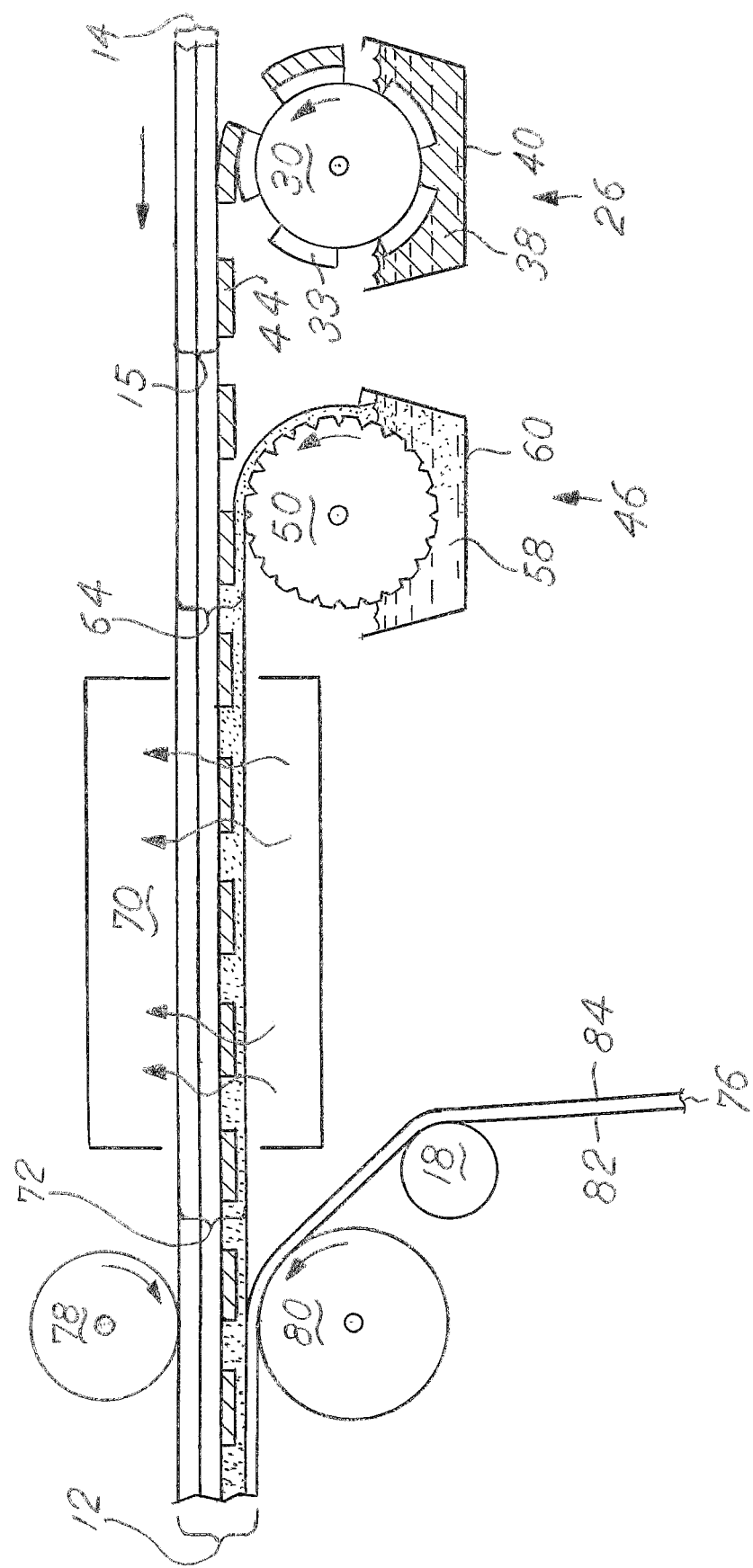
FIG. 2 is a simplified view of the adhesive and deadening agent application.
Figure 3:
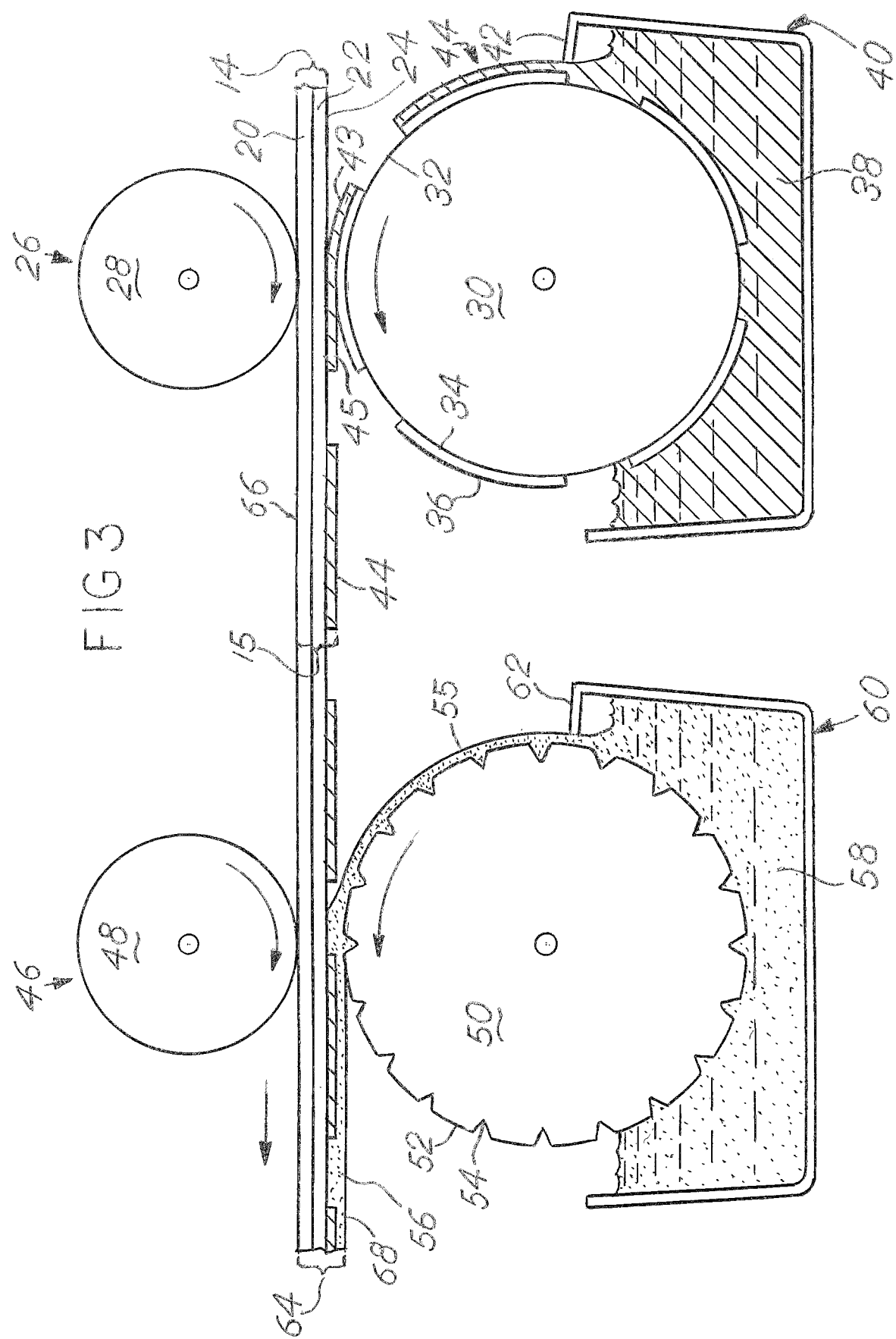
FIG. 3 is a partial view of the application process from FIG. 2.

The process flow 10 for making a selective pressure sensitive adhesive label stock 12 strip is shown in FIG. 1. A primary release paper 14 is unrolled from a roll 16 and travels through a series of idlers 18 at a linear speed. The primary release paper 14 has two main components. The first component of the release paper is typically a kraft paper substrate 20 that is clay-coated. The second component of the release paper is a silicone coating 22 on at least one side of the substrate 20 to form a release surface 24 as shown in FIG. 2. The release paper 14 can be other materials that have similar properties that allow cured adhesive to release and tolerate a curing process. It should be noted that the process flow 10 is from right to left in FIGS. 2 and 3 as noted with the arrow. The thickness of the parts as shown in FIGS. 2 and 3 is not to scale in order to show the detail. The primary release paper 14 as it is unrolled from roll 16 is held in tension through friction or other means. The release paper 14 is dimensionally stable, resists stretching, and provides a structural element to support handling and processing. The silicone coating 22 allows the subsequent removal of the finished product in a clean and simple fashion. The release paper 14 is merely a carrier and intended to be discarded once the label stock 12 is applied and is in use.

After the release paper 14 has passed through the idlers 18, it passes through a pattern kill station 26. The detail of the pattern kill station 26 is shown in FIG. 3. The primary release paper 14 enters and is moved between a backing roller 28 and a kill roller 30. The kill roller 30 has a base diameter 32 and raised portions 33, 34 with an outside surface 36. The kill roller 30 is partially submerged in a bath 40 of deadening agent 38 to apply the deadening agent 38 to the roller 30, particularly the outside surface 36. As cured, the deadening agent 38 does not have adhesive properties and is not a sticky or tacky surface. The bath 40 includes a doctor blade 42 that is separated from the kill roller 30 to set the thickness of the kill islands 44. The kill islands 44 have a dead surface 43 and a covered surface 45. The dead surface 43 is in direct contact with the release surface 24. The covered surface 45 will be covered in a subsequent step. The kill roller 30 has a tangential speed that is based on the radius of the deadening agent 38 or outside surface 36. This tangential speed matches the linear speed of the release paper 14 for clean coating and application without smearing. As the deadening agent 38 passes the doctor blade 42, the excess deadening agent 38 is scraped away and returns to the bath 40. The distance between the doctor blade 42 and the outside surface 36 determines the thickness. The backing roller 28 supports and positions the release paper 14 where the kill islands 44 are moved from the protrusions 33, 34 to the release surface 24. The kill islands 44 are then transferred to the release surface 24 as the release paper 14 passes directly over the kill roller 30. The release paper 14 and kill islands 44 form a strip of kill-coated paper 15 after this process. Only one side is coated with the kill islands 44; the opposite side is a non-coated surface 66. At this point, the kill-coated paper 15 has kill islands 44 spaced apart equal to the circumferential distance between adjacent raised portions 33, 34. Portions of the release surface 24 are still exposed at this point. The deadening agent 38 as shown in the bath 40 is a liquid. The selective application is done this way to prevent any trace amounts of the deadening agent 38 from being placed anywhere outside of the islands. Trace amounts of the deadening agent 38 could inhibit the proper adhesive properties of any subsequent coated layers. The base diameter 32, between raised portions 33, 34, may be coated with a non-stick material to allow the deadening agent 38 to fall away as the kill roller 30 rotates past the doctor blade 42. The deadening agent 38 is a liquid.

The kill-coated paper 15 then proceeds to an adhesive station 46. The details of the adhesive station 46 are shown in FIG. 3. The kill-coated paper 15 is moved between a backing roller 48 and a gravure roller 50. The gravure roller 50 has a primary diameter 52 and impressions 54. The impressions 54 are to improve the transfer capabilities of the gravure roller 50. The gravure roller 50 is partially submerged in a bath 60 of adhesive 58. The bath 60 includes a doctor blade 62 that is separated from the gravure roller 50 to set the thickness of the adhesive 58. The gravure roller 50 has a tangential speed based on the radius of the adhesive or primary diameter 52. This tangential speed matches the linear speed of the kill-coated paper 15 to have consistent coverage without disturbing the now-buried kill islands 44. The adhesive 58 proceeds around the gravure roller 50 in a continuous layer 56. The continuous layer 56 has a covering surface 55 which is applied over the covered surface 45 of the kill islands 44. The covering surface 55 also contacts the exposed release surface 24 between the kill islands 44 to form an adhesive surface 90. Opposite the adhesive surface 90 is a stock adhesive surface 68. After the gravure roller 50, the fully coated paper 64 with adhesive 58 proceeds through more idlers 18 as is shown in FIG. 1. The idlers 18 only contact the non-coated surface 66 of the fully coated paper 64. The adhesive 58 as shown in the bath 60 is a liquid.

The fully coated paper 64 then proceeds through a curing oven 70 where the continuous layer 56 and kill islands 44 are cured. The curing process can either be by heat, time, forced air, or a combination. The cured coated paper 72 leaves the oven 70. After the curing oven 70, the stock adhesive surface 68 becomes a continuous adhesive surface.

A roll 74 of face stock 76 unrolls and travels over idlers 18 before joining the cured coated paper 72 at a set of pinch rollers 78, 80. The face stock 76 has a printing side 82 and a back 84. The back 84 is pressed to the stock adhesive surface 68 to form a continuous strip of adhesive label stock 12. The printing side 82 is adapted to receive printing or is pre-printed before it is wound around the take-up roll 86. It is also contemplated that the face stock 76 is printed before it is placed on the roll 74. A simplified view of the process steps are shown in FIG. 2. Because the face stock 76 never travels through a curing oven 70 or process, a significant amount of options are available. For example, the face stock 76 can be thermally activated or contain materials that would not have survived a curing process.

Registration marks, either by printing, backing, or other indicators may be added to alert the user of the adhesive label stock 12 where to locate the printing in relation to the adhesive surface 90 and killed surface 92. One key difference between the process flow 10 and other adhesive processes is that the release paper 14 receives the adhesive 58 and then face stock 76 is applied to the fully coated paper 64.

As cured, an adhesive surface 90 is a pressure-sensitive adhesive, while a killed surface 92 is not. The adhesive surface 90 forms a boundary layer between the release surface 24 and the continuous layer 56. The label stock 12 is then cut to create a cut edge 98. The cut is located to align the killed surface 92 and adhesive surface 90 for the particular application. The printed and cut labels 100 are separated from the release paper 14 as shown in FIG. 4. During separation, the adhesive surface 90 is exposed. This is because the adhesive 58 preferentially adheres to the face stock 76 and is much more weakly bonded to the release surface 24. The continuous layer 56 and the kill islands 44 remain attached to each other when the release paper 14 is removed from the label stock strip as is shown in FIG. 4. In use, the label stock 12 is separated into individual labels 100 where the printing side 82 is facing outward, the adhesive surface 90 is affixed to a shelf 94 or other object. The killed surface 92 is exposed, and because it is a non-stick surface, the label 100 does not stick to itself or other nearby objects.

The thickness of the label stock 12 can be uniform as applied, because the adhesive layer 56 is thinner where it covers the kill islands 44. This creates a uniform thickness and therefore creates a uniform take-up roll 86.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A method for creating a pressure-sensitive adhesive backed label, said method comprising the following sequential steps:
   unwinding a roll of release paper to provide an elongate strip of release paper having a release surface;
   providing a kill roller having raised portions, applying deadening agent from said raised portions to form an array of islands spaced apart along said elongate strip on said release surface, said islands each having lateral edge boundaries, said release surface adjacent to each of said lateral edge boundaries defining exposed portions of said release surface, said islands being spaced along said release paper from each other so that said release surface is exposed between said lateral edge boundaries of adjacent said islands, said exposed portions of said release surface separating said islands;
   curing said exposed islands of said deadening agent upon said release liner;
   applying a continuous adhesive layer to said elongate strip of said release paper and overlaying said islands, said continuous adhesive layer overlaying and directly contacting said islands and said exposed portions of said release surface;
   curing said continuous adhesive layer;
   unwinding a roll of face stock to provide an elongate strip of face stock; and
   applying said elongate strip of face stock to said continuous adhesive layer to adhere said elongate strip of face stock to said continuous adhesive layer.

2. The method of claim 1, further comprising cutting through said elongate strip of face stock and separating said elongate strip of face stock into individual labels.

3. The method of claim 2, wherein said elongate strip of said release paper with said array of islands and said continuous layer of adhesive is cured in an oven.

4. The method of claim 1, further comprising cutting through said elongate strip of face stock to create individual cut labels having an adhesive surface and a killed surface.

5. The method of claim 4, wherein said cutting is near one of said lateral edge boundaries of said islands.

6. A method for creating a pressure-sensitive adhesive backed label, said method comprising the following sequential steps:
   providing an elongate strip of release paper having a release surface;
   providing a kill roller having raised portions, applying deadening agent to said raised portions;
   transferring said deadening agent from said raised portions to said release paper to form an array of islands spaced apart along a length on said release surface, said islands each having lateral edge boundaries, said release surface adjacent to each of said lateral edge boundaries defining exposed portions of said release surface, said islands being spaced from each other along said length so that said release surface is exposed between said lateral edge boundaries of adjacent said islands, said exposed portions of said release surface separating said islands;

curing said islands of said deadening agent upon said release liner;

applying a continuous adhesive layer to said elongate strip of said release paper and said islands on said release surface, said continuous adhesive layer overlaying and directly contacting said islands and said exposed release surface;

curing said continuous adhesive layer on said release paper in an oven;

providing an elongate strip of face stock; and applying said elongate strip of face stock to said continuous adhesive layer to adhere said elongate strip of face stock to said continuous adhesive layer.

7. The method of claim 6, further comprising cutting through said elongate strip of face stock and said release paper to form individual labels.

8. The method of claim 7, wherein said cutting is near one of said lateral edge boundaries of said islands.

9. The method of claim 6, further comprising providing a roll of release paper, unwinding said roll of release paper to provide said elongate strip of release paper.

10. The method of claim 6, further comprising providing a roll of face stock, unwinding said roll of face stock to provide said elongate strip of face stock.

11. A method for creating a pressure-sensitive adhesive backed label, said method comprising the following sequential steps:

providing an elongate strip of release paper having a release surface;

providing a kill roller having raised portions, applying deadening agent to said raised portions and transferring said deadening agent from said raised portions to said release paper to form an array of islands spaced apart along a length on said release surface, said islands each having lateral edge boundaries, said release surface adjacent to each of said lateral edge boundaries defining exposed portions of said release surface, said islands being spaced from each other along said length so that said release surface is exposed between said lateral edge boundaries of adjacent said islands, said exposed portions of said release surface separating said islands;

curing said islands of said deadening agent upon said release liner;

applying a continuous adhesive layer to said elongate strip of said release paper and said islands on said release surface, said continuous adhesive layer overlaying and directly contacting said islands and said exposed release surface;

curing said continuous adhesive layer on said release paper in an oven to cure said deadening agent and said continuous adhesive layer on said release liner; and applying an elongate strip of face stock to said continuous adhesive layer to adhere said elongate strip of face stock to said continuous adhesive layer.

12. The method of claim 11, further comprising cutting through said elongate strip of face stock and said release paper to form individual labels.

13. The method of claim 12, wherein said cutting is near one of said lateral edge boundaries of said islands.

14. The method of claim 11, further comprising providing a roll of release paper, unwinding said roll of release paper to provide said elongate strip of release paper.

15. The method of claim 11, further comprising providing a roll of face stock, unwinding said roll of face stock to provide said elongate strip of face stock.

* * * * *